United States Patent
Sproles et al.

(10) Patent No.: US 12,470,827 B2
(45) Date of Patent: Nov. 11, 2025

(54) SUB-SAMPLED WIDE FIELD IMAGING SYSTEM

(71) Applicant: The Boeing Company, Arlington, VA (US)

(72) Inventors: David E. Sproles, Kihei, HI (US); Zachary T. Stein, Haiku, HI (US)

(73) Assignee: The Boeing Company, Arlington, VA (US)

( * ) Notice: Subject to any disclaimer, the term of this patent is extended or adjusted under 35 U.S.C. 154(b) by 115 days.

(21) Appl. No.: 18/422,111

(22) Filed: Jan. 25, 2024

(65) Prior Publication Data

US 2025/0247625 A1     Jul. 31, 2025

(51) Int. Cl.
*H04N 23/698*    (2023.01)
*H04N 23/55*    (2023.01)

(52) U.S. Cl.
CPC ........... *H04N 23/698* (2023.01); *H04N 23/55* (2023.01)

(58) Field of Classification Search
CPC .............................. H04N 23/698; H04N 23/55
See application file for complete search history.

(56) References Cited

U.S. PATENT DOCUMENTS

| | | | | |
|---|---|---|---|---|
| 8,563,913 B2 * | 10/2013 | Dowski, Jr. | .......... | H04N 25/134 359/708 |
| 2017/0261651 A1 * | 9/2017 | Powell | ............... | G02B 27/0075 |
| 2023/0393452 A1 * | 12/2023 | Jackson | ............. | G03B 21/2066 |
| 2024/0264473 A1 * | 8/2024 | Huang | ................. | G03H 1/0256 |

OTHER PUBLICATIONS

Wang, et al., "MEMS Mirrors for LiDAR: A Review," Micromachines. 2020; 11(5):456. https://doi.org/10.3390/mi11050456.
Yin, et al., "Machine Learning Techniques for Taxi-out Time Prediction with a Macroscopic Network Topology," 2018 IEEE/AIAA 37th Digital Avionics Systems Conference (DASC), pp. 1-8, doi: 10.1109/DASC.2018.8569664.
Duncan et al., "Wide Angle Achromatic Prism Beam Steering for Infrared Countermeasures Applications," 2003, Electro-Optics and Photonics Faculty Publications, 42(4), pp. 1038-1047, doi: 10.1117/1.1556393.
Ostaszewski, et al., "Risley prism beam pointer," 2006, Proc. SPIE 6304, Free-Space Laser Communications VI, 630406. doi: 10.1117/12.679097.
Gibson, et al., "Wide-angle decentered lens beam steering for infrared countermeasures applications," 2004, Opt. Eng. 43(10). https://doi.org/10.1117/1.1789137.

* cited by examiner

*Primary Examiner* — Thai Q Tran
*Assistant Examiner* — Jose M Mesa
(74) *Attorney, Agent, or Firm* — Harrity & Harrity, LLP

(57) ABSTRACT

Systems, apparatuses, and methods provide for an imaging system including a lens assembly, an imaging sensor, and a steering mechanism. The lens assembly includes a wide field of view lens. The lens assembly is to receive raw light rays and to output transformed light rays with a full field of view. The transformed light rays include a first transformed light ray bundle and a second transformed light ray bundle. The imaging sensor is sized to collect image data from the transformed light rays from only a portion of the full field of view. The steering mechanism is to toggle the image data collected via the imaging sensor between the first transformed light ray bundle and the second transformed light ray bundle.

20 Claims, 14 Drawing Sheets

SUB-SAMPLED WIDE FIELD IMAGING SYSTEM

TECHNICAL FIELD

The present disclosure generally relates to imaging systems. More particularly, the present disclosure relates to wide field-of-view imaging systems.

BACKGROUND

An extremely wide-angle lens (or fisheye) collects light over a large range of angles. While a steered camera can provide good resolution at the target angle, a fish-eye system trades resolution for a wide field of regard (e.g., the same number of pixels will be spread over a larger area).

Some optical imaging systems have a Field of View (FoV) that can be steered or pointed inside a Field of Regard (FoR) that exceeds the base FoV. Such a pointing system allows for a given angular resolution of the system to be positioned as necessary inside the FoR. A common example would be a security camera on an articulated platform. Similarly, a camera connected to aircraft, spacecraft, or other vehicle via an articulated platform may be utilized.

SUMMARY

As described above, steered cameras have certain drawbacks. When using a camera attached to a structure or vehicle to take images of a variety of angles, there are applications where it is undesirable or impossible to reposition the camera assembly and collection optics. The reasons may vary. For example, steered cameras typically have significant distortion in the distribution of angles onto the camera surface. The addition of an articulated platform may be undesirable for a variety of reasons: minimizing complexity, minimizing controlled motion axes or the mass supported on those axes, eliminating compound motion, and/or eliminating the need to route high-bandwidth electrical signals from a stationary surface to a moving surface.

An alternate solution to this articulation would sacrifice angular resolution for the sake of expanding the FoV (referred to as wide field of view, or WFoV) to cover the whole FoR: where the entire FoV is mapped onto the sensor, meaning each pixel will cover a larger viewing angle, reducing the resolution (given identical sensors). A common example of this would be a WFoV camera oriented to observe all checkout lanes or all customers in a gambling establishment. Multiple or alternative sensors may be used to increase coverage or maintain angular resolution of the subjects, but changing the sensor or increasing sensor count will introduce tradeoffs with respect to frame rate, cost, availability, overall system complexity, and/or manufacturability.

As will be discussed in greater detail below, some systems, apparatuses, and methods described herein provide for combining aspects of these approaches. For example, a steering element is introduced into the optical chain, allowing good angular resolution and addressable FoV inside the FoR, while alleviating the requirement to articulate the entire imaging system (optics and sensor) as a unit. This has the added benefit of making it more difficult for observers to know the currently selected FoV out of the FoR.

As will be discussed in greater detail below, some systems, apparatuses, and methods described herein provide for an imaging system including a lens assembly, an imaging sensor, and a steering mechanism. The lens assembly includes a wide field of view lens. The lens assembly is to receive raw light rays and to output transformed light rays with a full field of view. The transformed light rays include a first transformed light ray bundle and a second transformed light ray bundle. The imaging sensor is sized to collect image data from the transformed light rays from only a portion of the full field of view. The steering mechanism is to toggle the image data collected via the imaging sensor between the first transformed light ray bundle and the second transformed light ray bundle.

For example, some systems, apparatuses, and methods described herein provide an imaging system attached to a fixed structure of a vehicle that has a large field of regard. That field of regard is intentionally sub-sampled (inside or after the lens assembly) into a sensor system (e.g., the sub-sampling may include the entire field of regard). The sub-sampling is done via some steering mechanism that can control the location of the sub-sampling region within the full field of regard. In some examples, the steering mechanism will redirect the angles of incoming light in a controllable way.

Advantageously, some examples herein address some or all of the above mentioned concerns by utilizing such a steering mechanism (e.g., which may include scanning) inside or after the lens assembly. In such an arrangement only a sub-region of the input light is mapped onto the sensing element. For example, only a narrow selection of the full field of regard reaches the sensor whereas the rest are lost. A different steering angle is achieved via a steering mechanism that would bring the other rays onto the sensor while the remaining rays miss the sensor. This design allows a very large field of regard while minimizing the movement of components or allowing a choice of motion patterns such as decoupling degrees of freedom or selecting between rotational or translational movement as other requirements dictate.

In one example, an imaging system includes a lens assembly, an imaging sensor, and a steering mechanism. The lens assembly includes a wide field of view lens. The lens assembly is to receive raw light rays and to output transformed light rays with a full field of view. The transformed light rays include a first transformed light ray bundle and a second transformed light ray bundle. The imaging sensor is sized to collect image data from the transformed light rays from only a portion of the full field of view. The steering mechanism is to toggle the image data collected via the imaging sensor between the first transformed light ray bundle and the second transformed light ray bundle.

In another example, a system includes an aircraft and an imaging system coupled to the aircraft. The imaging system including a lens assembly, an imaging sensor, and a steering mechanism. The lens assembly includes a wide field of view lens. The lens assembly is to receive raw light rays and to output transformed light rays with a full field of view. The transformed light rays include a first transformed light ray bundle and a second transformed light ray bundle. The imaging sensor is sized to collect image data from the transformed light rays from only a portion of the full field of view. The steering mechanism is to toggle the image data collected via the imaging sensor between the first transformed light ray bundle and the second transformed light ray bundle.

In a further example, a method includes receiving raw light rays and outputting transformed light rays with a full field of view via a lens assembly comprising a wide field of view lens. The transformed light rays include a first transformed light ray bundle and a second transformed light ray bundle. Image data is collected via an imaging sensor from the transformed light rays from only a portion of the full field of view. The image data collected via the imaging sensor is toggled via a steering mechanism between the first transformed light ray bundle and the second transformed light ray bundle.

This Summary is provided to introduce a selection of concepts in a simplified form that are further described below in the Detailed Description. The foregoing Summary, as well as the following Detailed Description of certain implementations, will be better understood when read in conjunction with the appended drawings. This Summary is not intended to identify key features or essential features of the claimed subject matter, nor is it intended to be used as an aid in determining the scope of the claimed subject matter.

BRIEF DESCRIPTION OF THE DRAWINGS

Various examples will be described below by referencing the following drawings, in which.

DETAILED DESCRIPTION

As will be discussed in greater detail below, some systems, apparatuses, and methods described herein provide an imaging system attached to a fixed structure of a vehicle that has a large field of regard. That field of regard is intentionally sub-sampled (inside or after the lens assembly) into a sensor system (e.g., the sub-sampling may include the entire field of regard). The sub-sampling is done via some steering mechanism that can control the location of the sub-sampling region within the full field of regard. In some examples, the steering mechanism will redirect the angles of incoming light in a controllable way.

Figure 1:
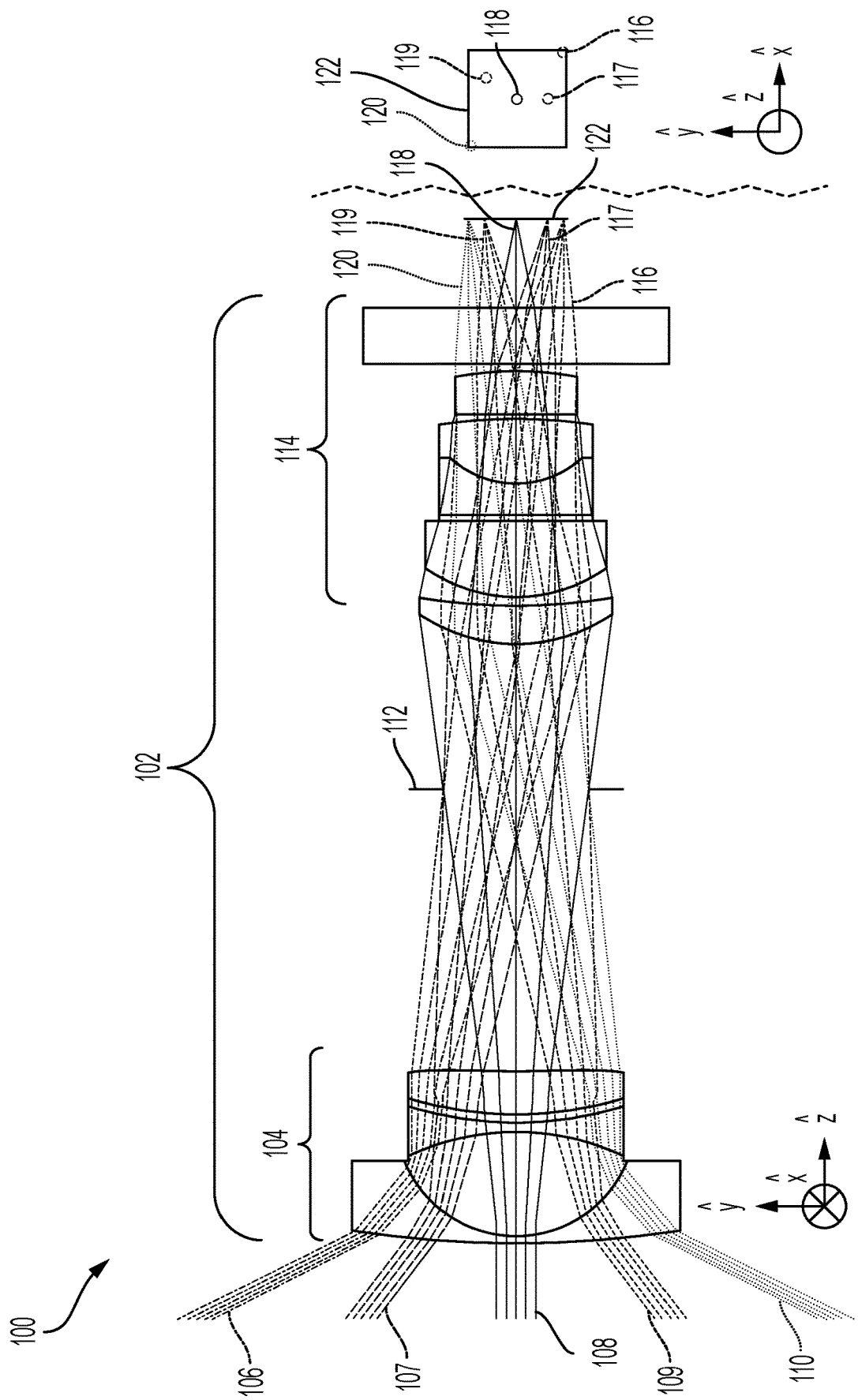
FIG. 1 is an illustration of a wide field-of-view imaging system.

FIG. 1 is an illustration of an imaging system 100. As illustrated, a wide field-of-view (WFoV) imaging system 100 may include lens assembly 102 comprising a wide field of view lens (e.g., a fisheye lens). Extreme designs with fields of view (FoV) of up to 270° have been realized (a FoV of 140°-190° is more common). The illustrated lens assembly 102 has a modest FoV for simplicity, but the ideas discussed below are generally applicable to lenses with fields of view from 45° up to 270°.

The illustrated example in FIG. 1 has a modest FoV for simplicity, but the ideas discussed are more generally applicable to larger FoV designs. The lens assembly 102 includes a negative lens group 104. The negative lens group 104 of this imaging system 100 collects light from a large range of angles. If imaging system 100 is fixed with respect to a notional reference frame (such as a building or vehicle), then this range of angles is both the FoV and the field of regard. If some or all of this optical system were mounted on an articulated assembly such that the object space optical axis can be pointed in different directions, then the range of motion of that assembly would extend the field of regard (FoR) by moving the FoV.

The negative lens group 104 of lens assembly 102 has a negative focal length and serves to take light rays from all of the field angles, ranging from a first edge ray bundle 106, a first intermediate ray bundle 107, a center ray bundle 108, a second intermediate ray bundle 109, and a second edge ray bundle 110, and send them through an aperture stop 112. Reasonable corrections for aberrations are achieved by choices in the designs of the negative lens group 104 and the subsequent positive lens group 114. The positive lens group 114 has a positive focal length and focuses the light onto a focal surface where a full sized imaging sensor 122 is located. The positive lens group 114 focuses the light (e.g., as a fourth transformed light ray bundle 116 corresponding to first edge ray bundle 106, a fifth transformed light ray bundle 117 corresponding to first intermediate ray bundle 107, a first transformed light ray bundle 118 corresponding to center ray bundle 108, a second transformed light ray bundle 119 corresponding to second intermediate ray bundle 109, and a third transformed light ray bundle 120 corresponding to second edge ray bundle 110) onto the focal plane where the imaging sensor 122 is located. As shown, all the rays, including rays from the edge of the field of view (e.g., third transformed light ray bundle 120 corresponding to edge ray bundle 110) are mapped to the full sized imaging sensor 122.

This type of system collects light from a hemispherical-shell focal region and generates a flat circular image. The result is unavoidable distortion, to some extent. This distortion presents itself as deformation of some of the ray bundles (e.g., third transformed light ray bundle 120 corresponding to second edge ray bundle 110) such that image 'height' (measured along the radius of the circular image) is compressed the closer you are to the edge of the image.

One primary tradeoff to this system is the sensor shape mismatch: the round image can be made to fit almost entirely on the square detector (the corners of which will go unused) or the square detector will fit entirely inside the image (meaning the full FoV is only used along the diagonal).

For any given imaging system, if objects of interest are less than the full FoV, then pixels (and angular resolution) is wasted on irrelevant regions. This could be remedied by mounting an imaging system with a more-narrow FoV onto an articulated platform. This poses new complications that may be unacceptable, such as increased fragility/complexity, as well as the added possibility of revealing FoV pointing to external observers. Further, some systems may desire a FoR larger than their design FoV (even with WFoV systems), resulting in the same set of choices regarding articulation and observability.

As will be discussed in greater detail below, advantageously, some examples herein address some or all of the above mentioned concerns by utilizing a steering mechanism inside or after the lens assembly. In such an arrangement only a sub-region of the input light is mapped onto the sensing element.

Figure 2:
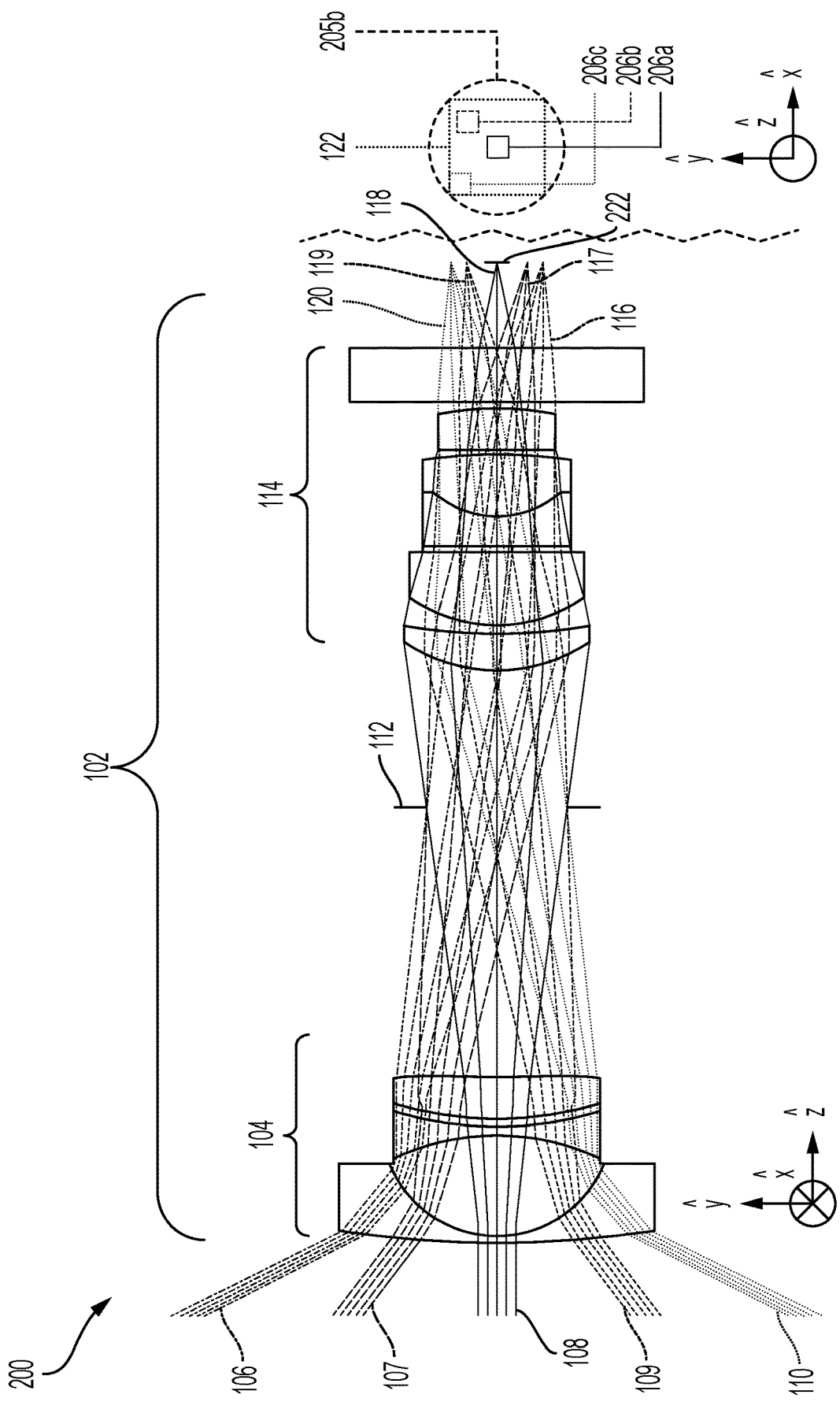
FIG. 2 is an illustration of an imaging system illustrating different sized imaging sensors according to an example.

FIG. 2 is an illustration of an imaging system 200 illustrating different sized imaging sensors according to an example. As illustrated, imaging system 200 is shown comparing two imaging sensors, a full sized imaging sensor 122 (as is illustrated in FIG. 1) in dashed lines and an imaging sensor 222 of a smaller scale. The imaging sensor 222 is sized to collect image data from the transformed light rays from only a portion of the full field of view.

In some implementations, the imaging sensor is a single element detector. In some examples, the single element detector is high-bandwidth photodetector. For example, the single element detector is an avalanche photodiode, a spatially filtered photomultiplier tube, or the like (e.g., in embodiments utilizing mirrors as part of a steering mechanism).

For example, only a narrow selection of the full field of regard reaches the imaging sensor 222 whereas the rest are lost. As will be discussed in greater detail below, a different steering angle is achieved via a steering mechanism that would bring the other rays onto the imaging sensor 222 while the remaining rays miss the imaging sensor 222. This design allows a very large field of regard while minimizing the movement of components or allowing a choice of motion patterns such as decoupling degrees of freedom or selecting between rotational or translational movement as other requirements dictate.

In this example, full sized imaging sensor 122 represents the full field of view. A traditional design would have a sensor the size of full sized imaging sensor 122, which would observe the entire field of view simultaneously. As will be discussed in greater detail below, implementations herein instead utilize the imaging sensor 222 which is sized to collect image data from the transformed light rays from only a portion of the full field of view.

An alternate way to phrase this is that where only one sensor size is available; the size of the other components (e.g., 104, 112, and 114) are scaled such that the imaging sensor 222 has a relative size represented here. When scaled up such that the sensor resembles imaging sensor 222, the relative collection aperture is increased, allowing the angular field of view of individual pixels (instantaneous FoV (iFoV)) of imaging sensor 222 to be exposed to the same intensity of light as when the optics are scaled such that the sensor resembles full sized imaging sensor 122.

As will be discussed in greater detail below, advantageously, some examples herein utilize a steering mechanism inside or after the lens assembly. In such an arrangement only a sub-region of the input light is selectively mapped onto the imaging sensor 222.

For example, one implementation adds a translation stage to the focal plane array (FPA) or imaging sensor 222 and scales up the dimensions of the lens system (in comparison to the size of the sensor) as shown in FIG. 2. This translation stage will allow the imaging sensor 222 to be located anywhere within the bounds of area 205b. Coordinate systems are shown on the figure for clarity. The left side shows a cut-away view with raytracing that forms an image at the focal surface where indicated. The right side shows fields of view for the focal surface.

In this example, area 205b represents the full field of view. Areas 206a, 206b, and 206c represent some possible FoVs that contain the respective rays of 116-120 (where each of rays 116-120 is representative of one point in the FoV and one point on the imaging sensor 222). Conversely, the design of FIG. 1 uses an imaging sensor 122 with a relative size of illustrated here in dashed lines (e.g., a size able to reach the edge of area 205b), which would allow the imaging sensor 122 to be exposed to the entire field of view FoR simultaneously. An alternate way to phrase this is that where only one sensor size is available; the size of the other components of lens assembly 102 are scaled such that the sensor has a relative size represented by either imaging sensor 122 or imaging sensor 222. By scaling up the size of the lens assembly 102 (and therefore having relatively smaller FoV as indicated by 206a-c), the collection aperture (e.g., as measured with respect to pixel size) is increased, while the angular field of view of the individual pixels (e.g., this angular field of view is referred to as instantaneous FoV or iFoV) of area 206a-c is decreased. This will improve the resolution of the image (e.g., finer features of the object will be resolvable) while not decreasing the amount of radiance delivered to each pixel.

As will be described in greater detail below, to select the field of view, the imaging sensor 222 can be translated to any position inside the full field of regard of area 205b with an actuation mechanism.

Figure 3:
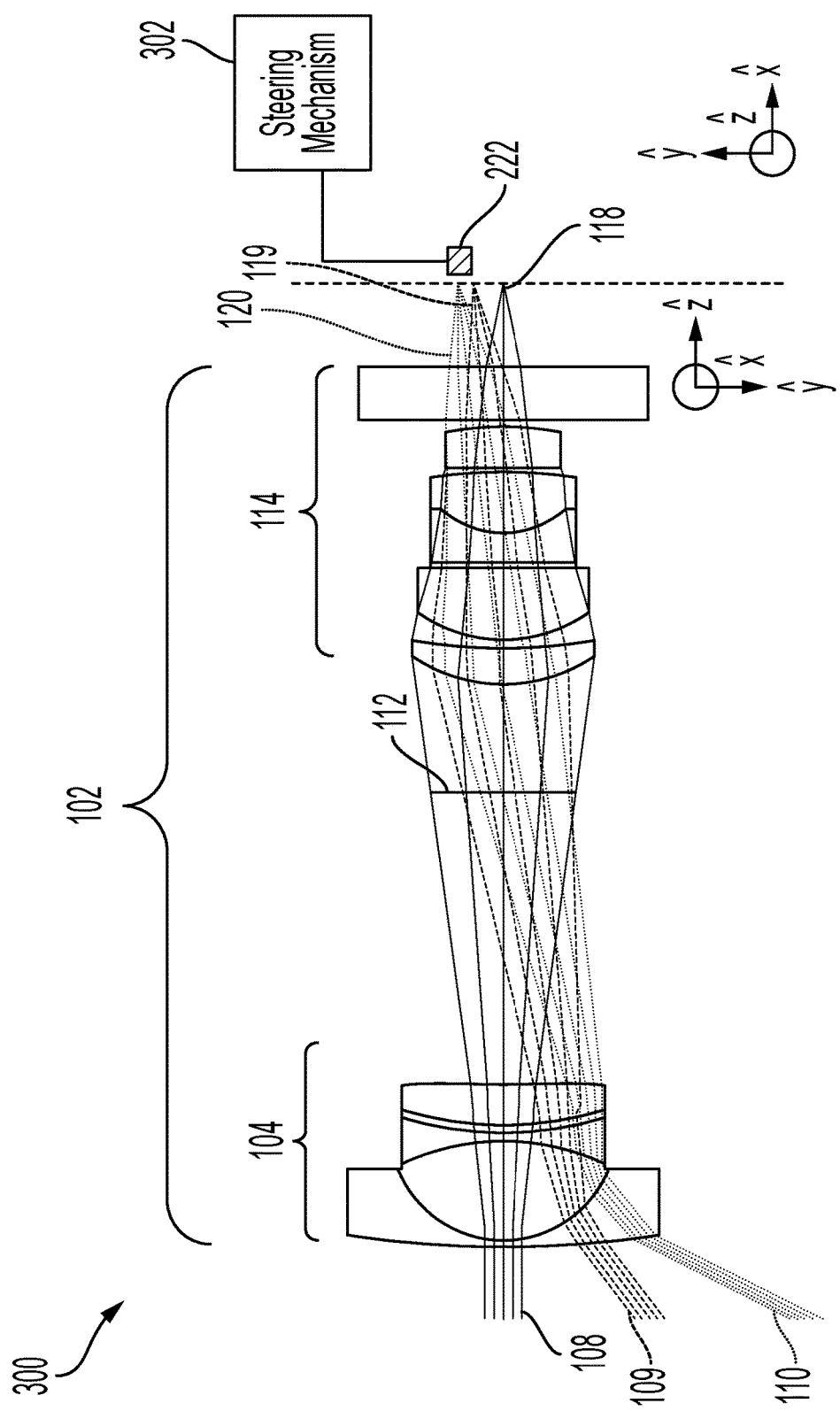
FIG. 3 is an illustration of an imaging system illustrating a steering mechanism coupled to the imaging sensor according to an example.

FIG. 3 is an illustration of an imaging system 300 illustrating a steering mechanism coupled to the imaging sensor according to an example. As illustrated, the imaging system 300 including a lens assembly 102, imaging sensor 222, and a steering mechanism 302. The lens assembly 102 is to receive raw light rays and to output transformed light rays with a full field of view. The transformed light rays include a first transformed light ray bundle 118 and a second transformed light ray bundle 119 (e.g., and a third transformed light ray bundle 120, etc.).

The lens assembly 102 comprises negative lens group 104 to receive the raw light rays and positive lens group 114 located downstream from the negative lens group 104. The lens assembly 102 comprises a wide field of view lens.

The imaging sensor 222 is sized to collect image data from the transformed light rays from only a portion of the full field of view.

The steering mechanism 302 is to toggle the image data collected via the imaging sensor 222 between the first transformed light ray bundle 118 and the second transformed light ray bundle 119. In the illustrated example, the steering mechanism 302 is coupled to the imaging sensor 222 to move the imaging sensor 222 in two degrees of freedom (e.g., illustrated here as movement in the x-y plane).

As illustrated, this implementation adds a translation stage to the imaging sensor 222. To select the field of view, imaging sensor 222 is mechanically translated inside the full field of regard. This embodiment may utilize electrical signal routing of high frequency imaging sensor data from a moving sensor to a fixed point.

Figure 4:
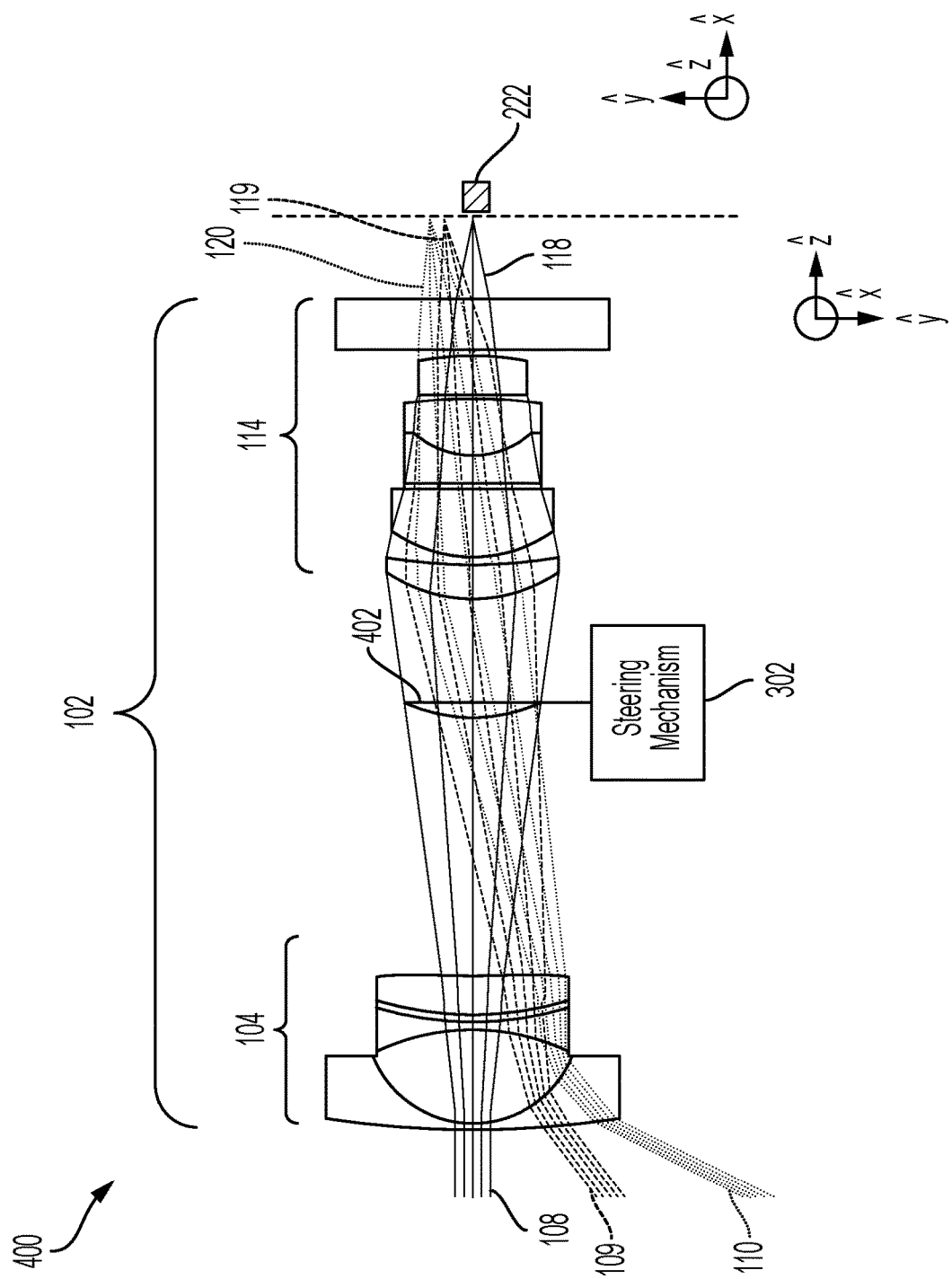
FIG. 4 is an illustration of an imaging system illustrating a steering mechanism including a laterally translatable lens according to an example.

FIG. 4 is an illustration of an imaging system 400 illustrating a steering mechanism including one or more laterally translatable lenses 402 according to an example. As illustrated, the steering mechanism 302 is located between the negative lens group 104 and the positive lens group 114. The steering mechanism 302 includes a laterally translatable lens 402. Accordingly, movement of the laterally translatable lens 402 toggles the image data collected via the imaging sensor 222 between the first transformed light ray bundle 118 and the second transformed light ray bundle 119. All of these route to a stationary imaging senor 222 in the same position.

In some implementations, the laterally translatable lens 402 includes an additional lens assembly with one or more adjustable elements. For example, such adjustable elements include three lenses, two of which need to be laterally translated to steer off the center axis (radially) and could then be rotated (around the radial axes) to select the desired angular degree of freedom. This would effectively yield full x-y translation as discussed above with respect to FIG. 3, but with a different parameterization (r, θ).

In another example, such an adjustable element includes a variable-focus liquid lens. There are multiple liquids with different indices of refraction available for use in such lenses. Accordingly, some level of chromatic dispersion correction may be achieved with such an implementation.

Figure 5:
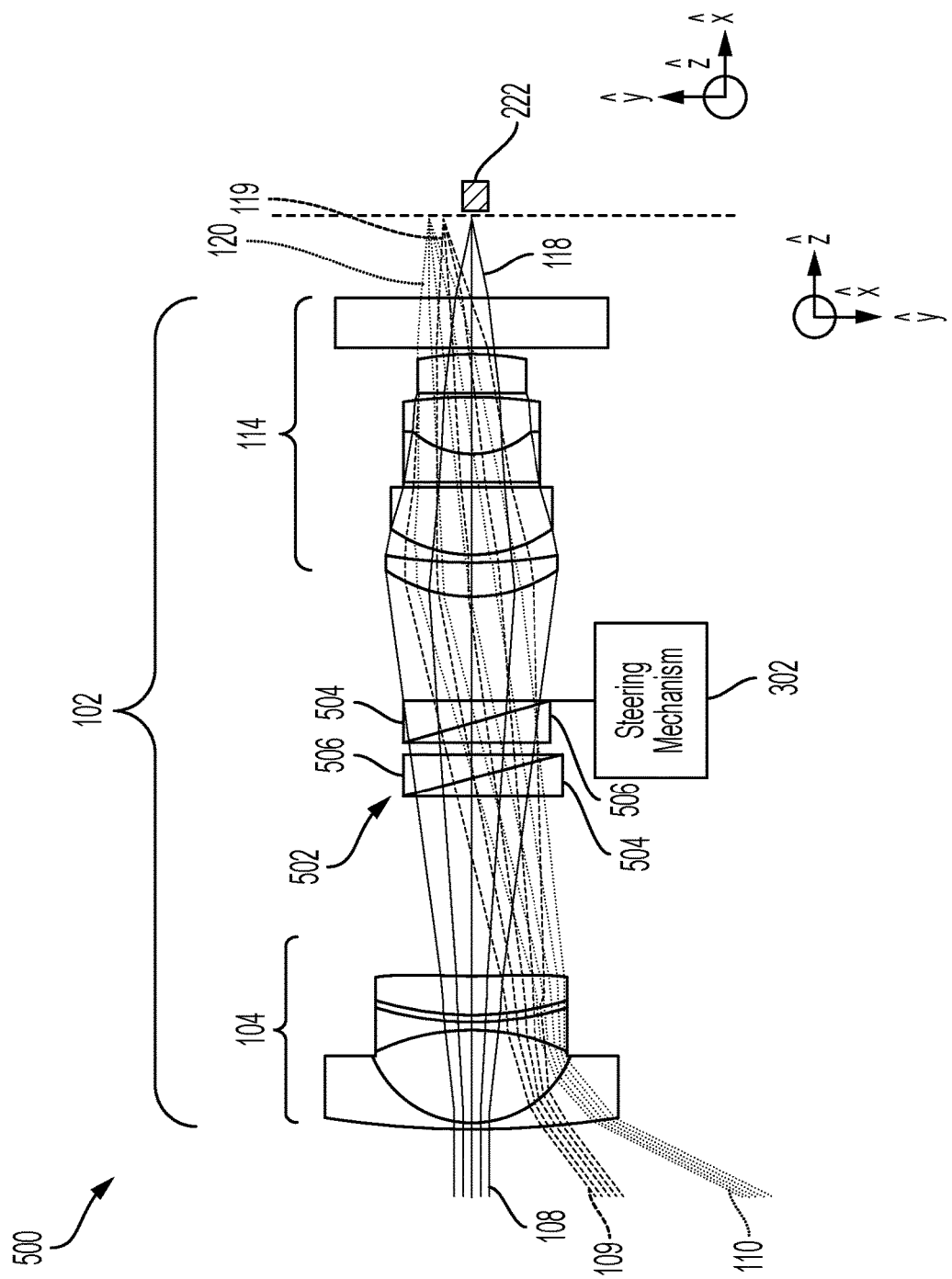
FIG. 5 is an illustration of an imaging system illustrating a steering mechanism including two or more dispersion-corrected prisms according to an example.

FIG. 5 is an illustration of an imaging system 500 illustrating a steering mechanism including two or more dispersion-corrected prisms 502 according to an example. As illustrated, the steering mechanism 302 is located between the negative lens group 104 and the positive lens group 114. The steering mechanism 302 includes two or more dispersion-corrected prisms 502. Accordingly, movement of the two or more dispersion-corrected prisms 502 toggles the image data collected via the imaging sensor 222 between the first transformed light ray bundle 118 and the second transformed light ray bundle 119. All of these route to a stationary imaging senor 222 in the same position.

In operation, the two or more dispersion-corrected prisms 502 provide chromatic dispersion. In some examples, the two or more dispersion-corrected prisms are achromatic prism assemblies where two or more prisms of different index of refraction are affixed together.

In some examples, at large pointing angles, these prisms produce the reverse distortion typically found at the edges of WFoV lenses. For example, the two or more dispersion-corrected prisms 502 extend the image radially, rather than compressing it. This is opposite to the distortion from WFoV lenses. This may decrease distortion for images around the edge of the FoR.

In operation, implementations utilizing a pair (or triad) of dispersion-corrected prisms produce the reverse distortion typically found at the edges of a WFoV lenses at large pointing angles (e.g., the image is extended radially, rather than compressed). This will decrease distortion for images around the edge of the FoR. For example, such a dispersion-corrected prism steering mechanism may serve to intrinsically compensate for distortion around the edges of the field of view.

As illustrated, each of the two or more dispersion-corrected prisms 502 include a first sub-prism 504 coupled with a second sub-prism 506. Additional prisms may be utilized (e.g., three dispersion-corrected prisms 502). Additionally, or alternatively, each of the two or more dispersion-corrected prisms 502 may include additional sub-prisms, as discussed below with respect to FIG. 13.

Figure 13:
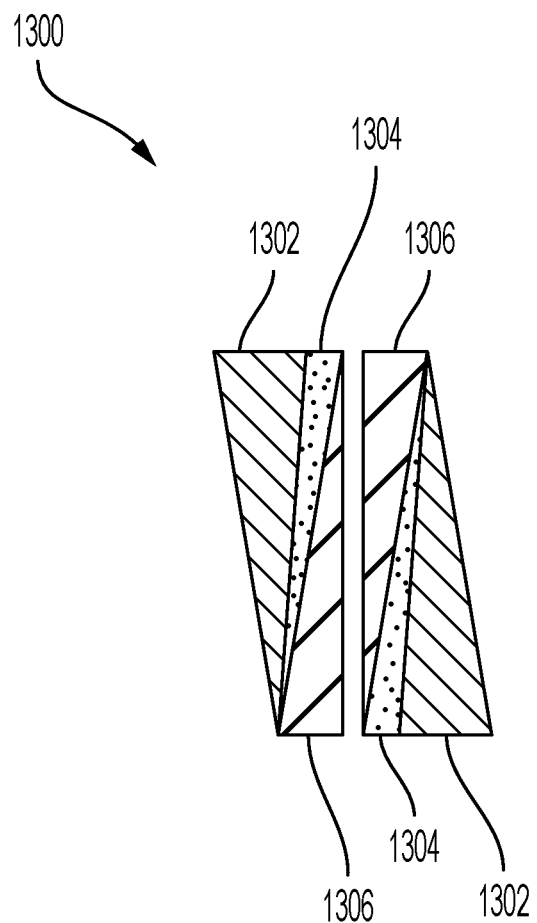
FIG. 13 is an illustration of a triad of dispersion-corrected prisms.

FIG. 13 is an illustration of a triad of dispersion-corrected prisms 1300. As illustrated, the triad of dispersion-corrected prisms 1300 include a first sub-prism 1302 coupled with a second sub-prism 1304 and a third sub-prism 1306.

Figure 12:
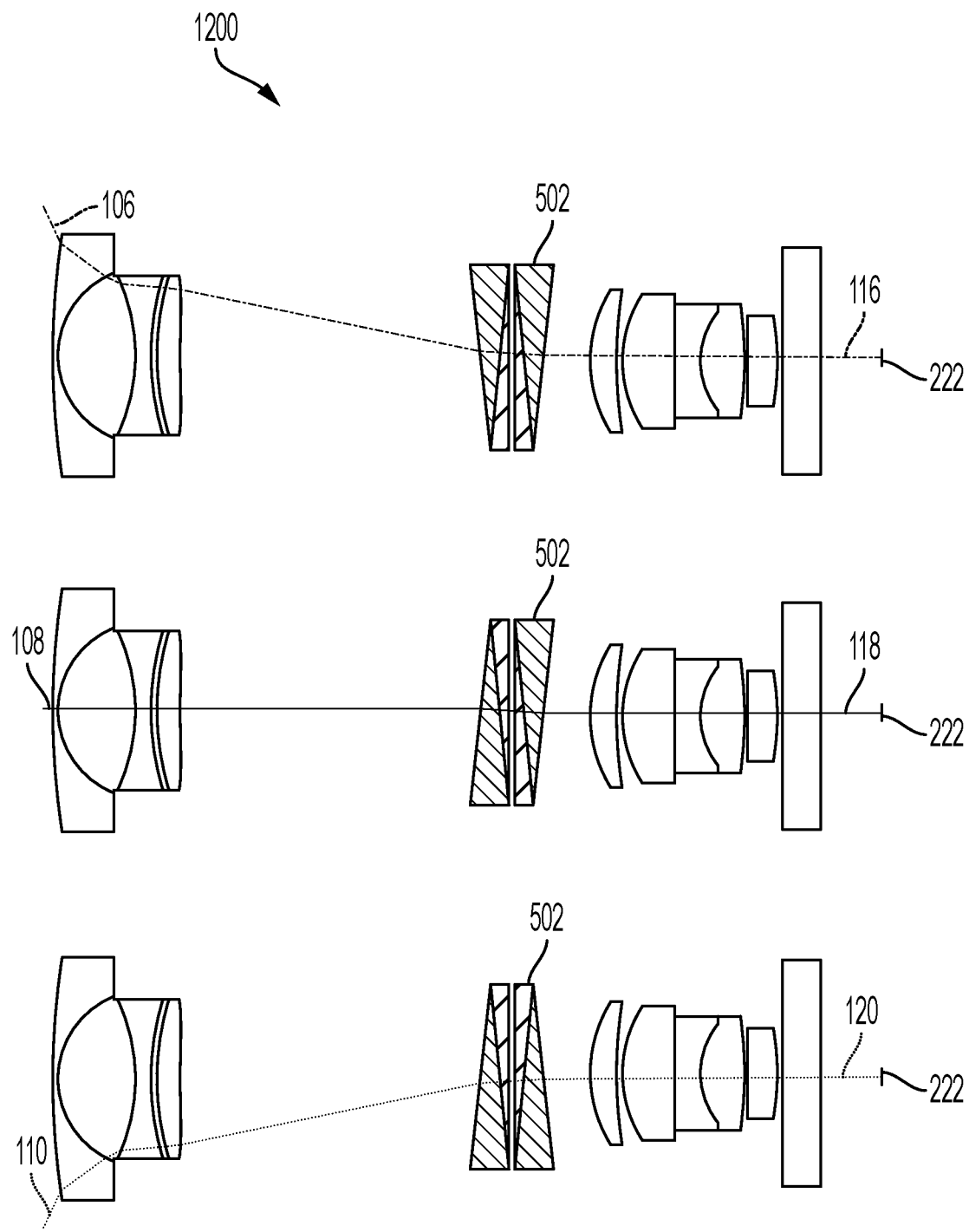
FIG. 12 is an illustration of an imaging system illustrating a steering mechanism including two or more dispersion-corrected prisms according to an example.

FIG. 12 is an illustration of an imaging system 1200 illustrating a steering mechanism including two or more dispersion-corrected prisms 502 according to an example. As illustrated, movement of the two or more dispersion-corrected prisms 502 toggles the image data collected via the imaging sensor 222 between the first transformed light ray bundle 118 and the second transformed light ray bundle 119 (and the third transformed light ray bundle 120, etc.).

For example, the illustrated arrangement of prisms and lenses can successfully steer the rays onto imaging sensor 222 from different angles. This lens system may utilize additional positive elements (following the negative group, and not shown here) from the previously raytraced systems, as the prisms will introduce color aberration if the ray bundles are not collimated. For example, additional curved mirrors and/or lenses may be used as a group to provide a positive focal length. Some of this color aberration may be optimized in concert with other elements to neutralize overall color aberration. The exit face of the prisms (e.g., imaging sensor 222 side) will be near or at a pupil. In some implementations, it may be advantageous to offset the rotation axis from the central axis of the system in order to compensate for some asymmetries, but there are other ways to address such asymmetries (e.g., using a third prism set, as noted above.)

Figure 6:
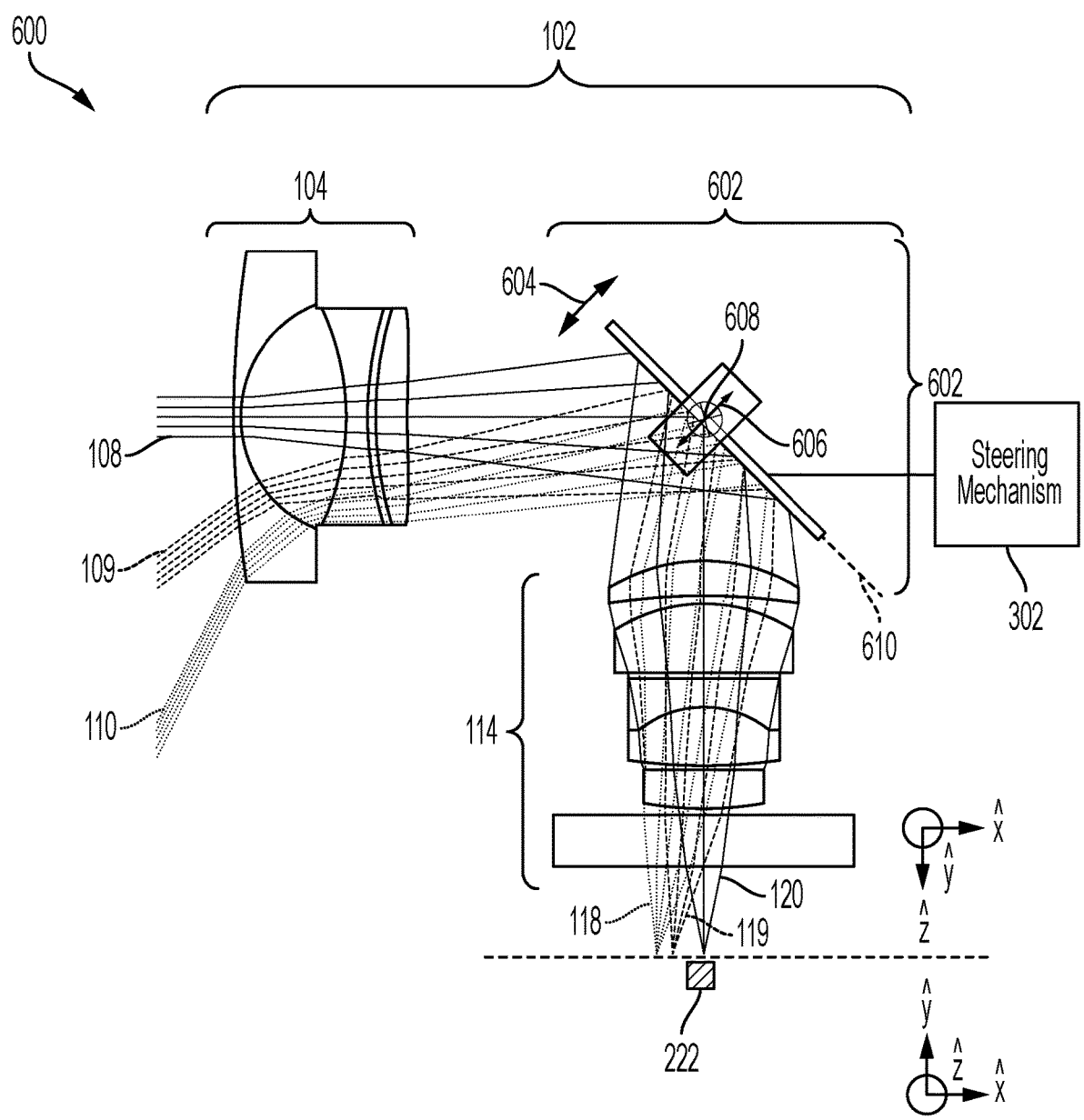
FIG. 6 is an illustration of an imaging system illustrating a steering mechanism including one or more mirrors according to an example.

FIG. 6 is an illustration of an imaging system 600 illustrating a steering mechanism including one or more mirrors according to an example. As illustrated, the steering mechanism 302 is located between the negative lens group 104 and the positive lens group 114. The steering mechanism 302 includes one or more mirrors 602. Accordingly, movement of the one or more mirrors 602 toggles the image data collected via the imaging sensor 222 between the first transformed light ray bundle 116 and the second transformed light ray bundle 120.

In some examples, the one or more mirrors 602 are implemented as a single two degree-of-freedom mirror, two single degree-of-freedom mirrors, or three single degree-of-freedom mirrors.

In one implementation, a version of this design places a two degree-of-freedom (DoF) steering mirror (as the one or more mirrors 602) near or at the pupil. Rotation for 602 is shown with range of motion 604 and range of motion 606, while the axes around which the mirror rotates are axis 608 and axis 610 respectively. In such an implementation, if the only change to the imaging system is the addition of the actuated steering mirror 602, then this system will image rays other than 108 with a compromise in image quality. Accordingly, the components of lens assembly 102 may be modified to correct for aberrations to image rays other than 108, which can be accomplished in a variety of ways such as adding elements with aspheric surfaces.

An alternate form of this embodiment replaces a two degree-of-freedom (DoF) steering mirror (as the one or more mirrors 602) with two 1-DoF steering mirrors with their rotation axes orthogonal to each other. In such an example, addressable galvanometers are utilized to allow for high speed movement and could readily track high-speed objects as they move across the system FoR.

A further iteration of this embodiment would use three 1-DoF mirrors. In such an implementation, the imaging sensor 222 includes a single element detector such as an avalanche photodiode, a spatially filtered photomultiplier tube, or the like. In some implementations, two galvanometers and one resonant scanner are utilized to adjust the position of the three 1-DoF mirrors. Coarse positioning of the FoV inside the FoR would be achieved by the two galvanometers, while one galvanometer and the resonant scanner would sweep the detection point to create the field of view. Alternatively, this single-element detector embodiment could be achieved by two galvanometer scanners.

Figure 9:
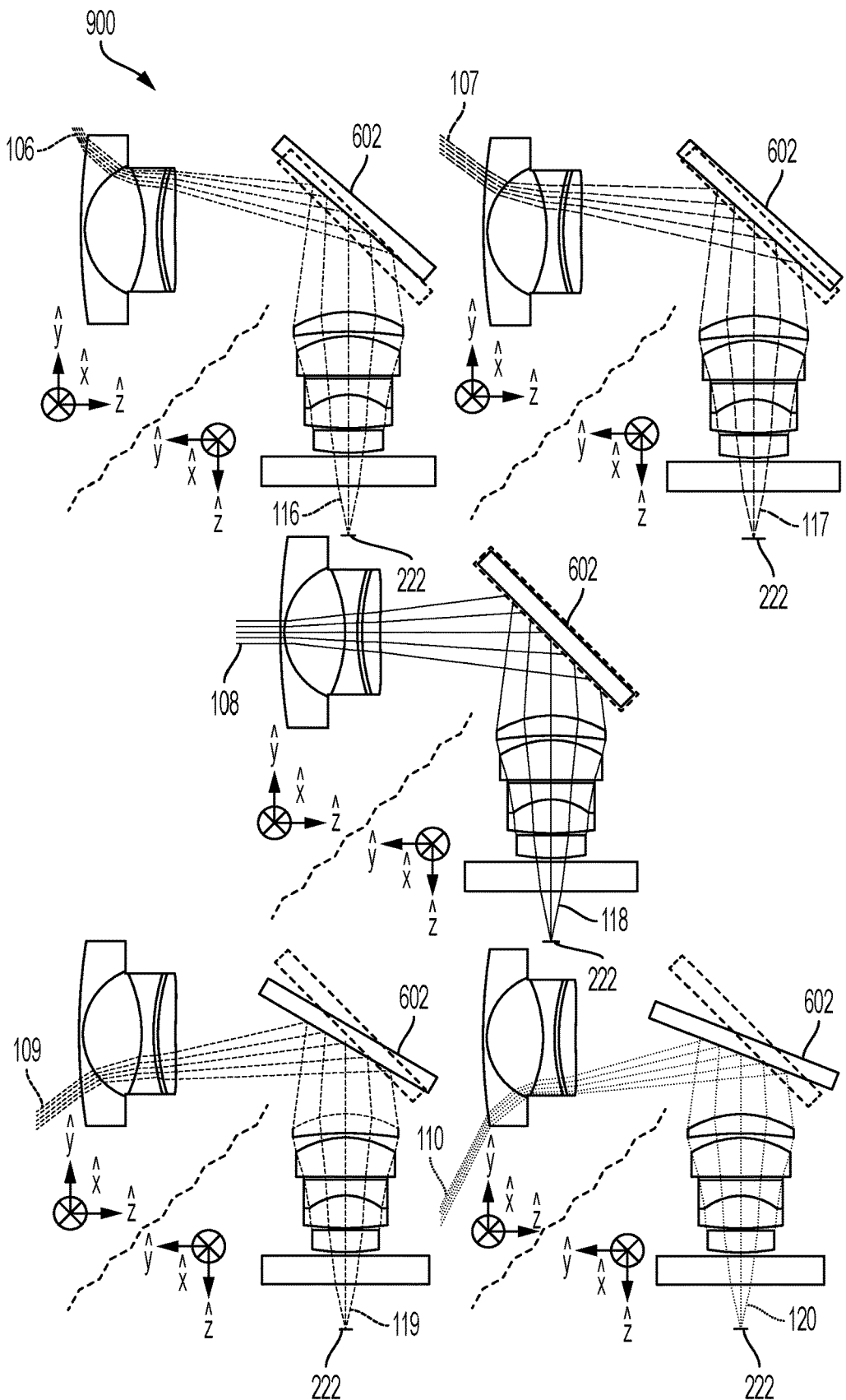
FIG. 9 is an illustration of an imaging system illustrating a steering mechanism including one or more mirrors according to an example.

FIG. 9 is an illustration of an imaging system 900 illustrating a steering mechanism including one or more mirrors according to an example. As illustrated, FIG. 9 shows an implementation with an actuated mirror 602 in use. There are separate raytraces for different fields of view. All of these route to a stationary imaging senor 222 in the same position.

The actuator for this steering mirror 602 can be a simple two degree of freedom (DoF) mount. However, if this steering mirror 602 is actuated as shown in FIG. 9 where more than 2-DoF control is utilized, it will relax the optical system requirements (meaning complexity of the lens designs). The actuation in FIG. 9 uses rotation around two axes as well as translation normal to the surface of the mirror 602. This could be implemented with any configuration of motion control options that can attain the desired mirror positions. One simple example is a translation stage and a mirror mount. Many motion control mounts have three degrees of freedom, which could easily cover the ranges needed. Another option would be a hexapod mirror mount with sufficient range of motion. These choices allow the mirror to be located away from a pupil, as is illustrated in FIG. 9.

An alternate embodiment would use more than one 2- or 3-DoF mirror mounts. This will allow additional freedom in choices with respect to satisfying optical system requirements.

Figure 10:
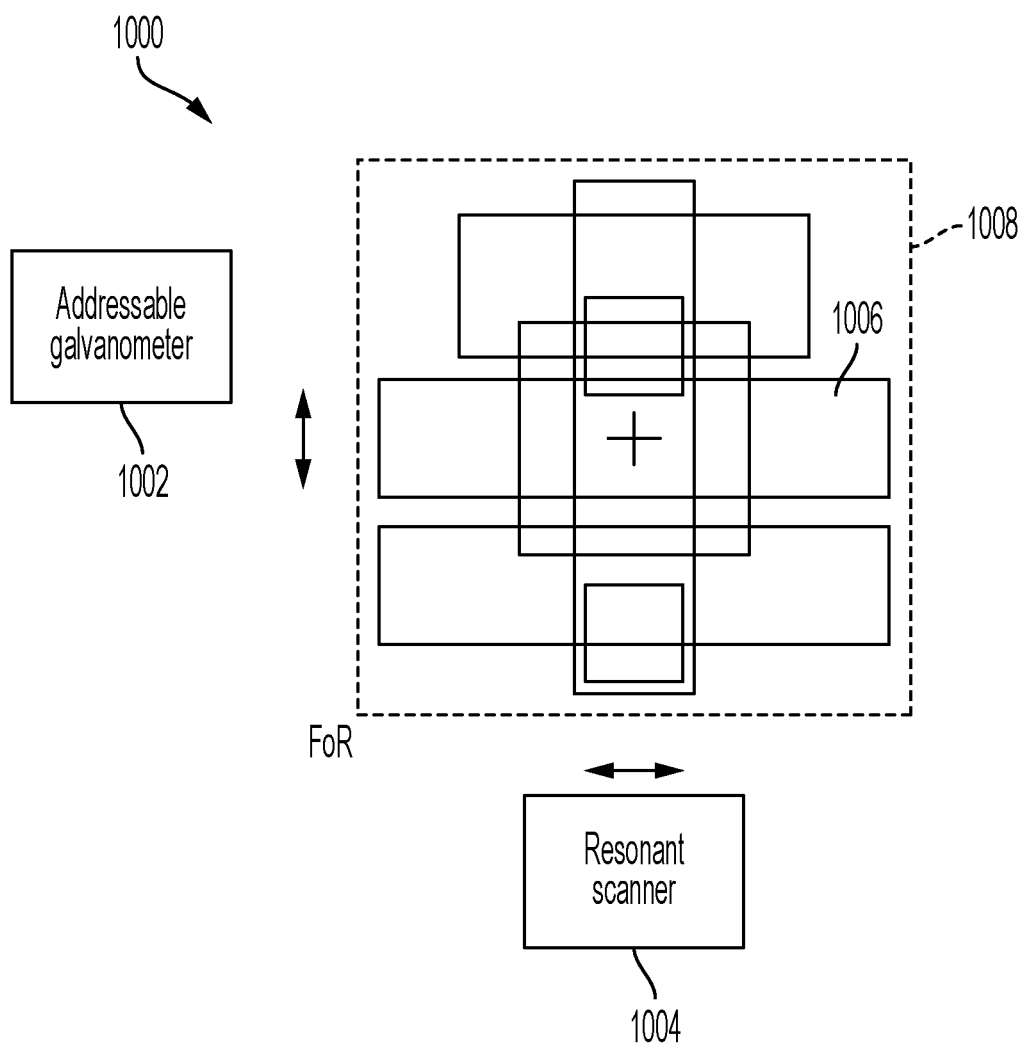
FIG. 10 is an illustration of an imaging system illustrating a steering mechanism including a galvanometer and a resonant scanner according to an example.

FIG. 10 is an illustration of an imaging system 1000 illustrating a steering mechanism (e.g., such as steering mechanism 302 associated with actuated steering mirror 602 in FIG. 6) including a galvanometer 1002 associated with a first mirror and a resonant scanner 1004 associated with a second mirror according to an example. As illustrated, using a single galvanometer 1002 and a single resonant scanner 1004 (e.g., as a steering mechanism for the one or more mirrors 602 illustrated in FIG. 6) would be one implementation. Since the mean pointing position of the resonant scanner 1004 is not typically adjustable, the field of view would be limited to a strip including the center of the FoR. FIG. 10 shows some example Field of Views (FoVs) 1006 inside the overall Field of Regard (FoR) 1008; where all will be symmetric around the center along the resonant scanner 1004 dimension. This may be useful if the desired FoV needs to move along a known arc. In such an example, the resonant scanner 1004 would modulate perpendicularly to the arc and the galvanometer 1002 would track along the arc. In other examples, multiple galvanometers, multiple resonant scanners, the like, and/or combinations thereof may be utilized for the steering mechanism.

Figure 11:
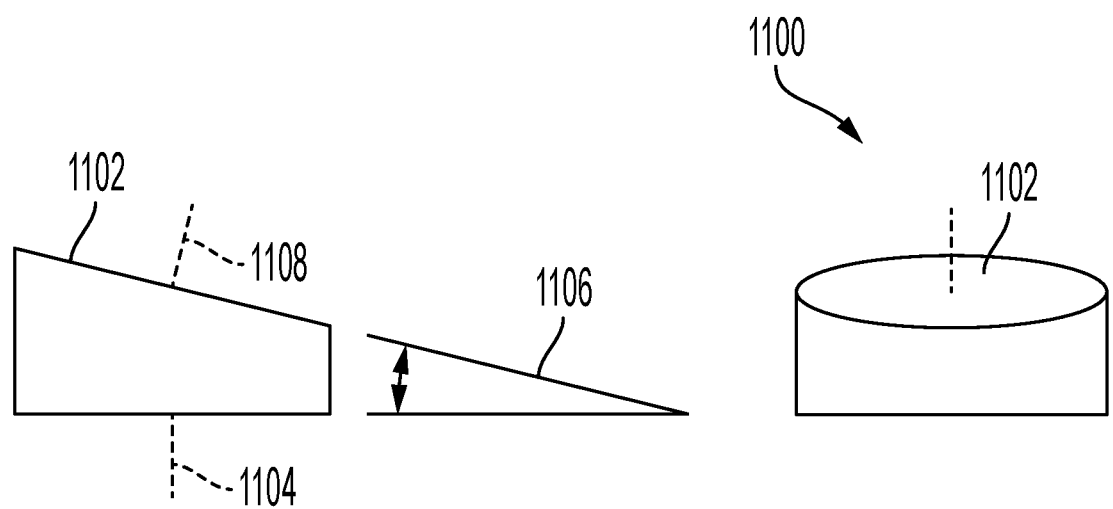
FIG. 11 is an illustration of an imaging system illustrating a steering mechanism including a pair of mirrors, each with a reflective surface slightly tilted with respect to their rotation axis according to an example.

FIG. 11 is an illustration of an imaging system illustrating a steering mechanism including a pair of mirrors, each with a reflective surface slightly tilted with respect to their rotation axis according to an example. As illustrated, each mirror 1100 of a pair of mirrors are able to rotate a reflective surface 1102 about a rotation axis 1104 slightly tilted at an angle 1106 with respect to their normal surface 1108 (this would resemble a pair of Risley prisms, but in reflection).

The relative deviation angle shown here is likely exaggerated for illustrative purposes. The angle of each mirror 1100 of the pair of mirrors would be chosen such that the full FoR can be covered. In this case, two mirrors are discussed; however, the same complexity relaxation applies if additional mirrors are included.

A further implementation, that could be utilized in one or more of the imaging system 300 (FIG. 3), the imaging system 400 (FIG. 4), the imaging system 500 (FIG. 5), and/or the imaging system 600 (FIG. 6) already discussed, would be to introduce zoom capabilities to change the size of the addressed sub-region of the input light (e.g., possibly even filling the sensor with the entire field of regard at the extreme range of the zoom). In some examples, the size of the sub-sampled region may be made variable (e.g., up to sampling the entire field of regard) by modifying the design to have adjustable internal elements. This would typically be a zoom-enabled version. This adjustment may include axial translation of elements or groupings of elements, or actuation of lens elements to modify their focusing power such as liquid lenses, or a deformable mirror that can change focusing power, or some other optical element with variable power.

In some implementations, if the sub-sampled region contains the full field of regard, the steering mechanism may be used to intentionally reject unwanted incoming light from objects in the field of regard. One example would be to keep the Sun out of the field of view.

Figure 7:
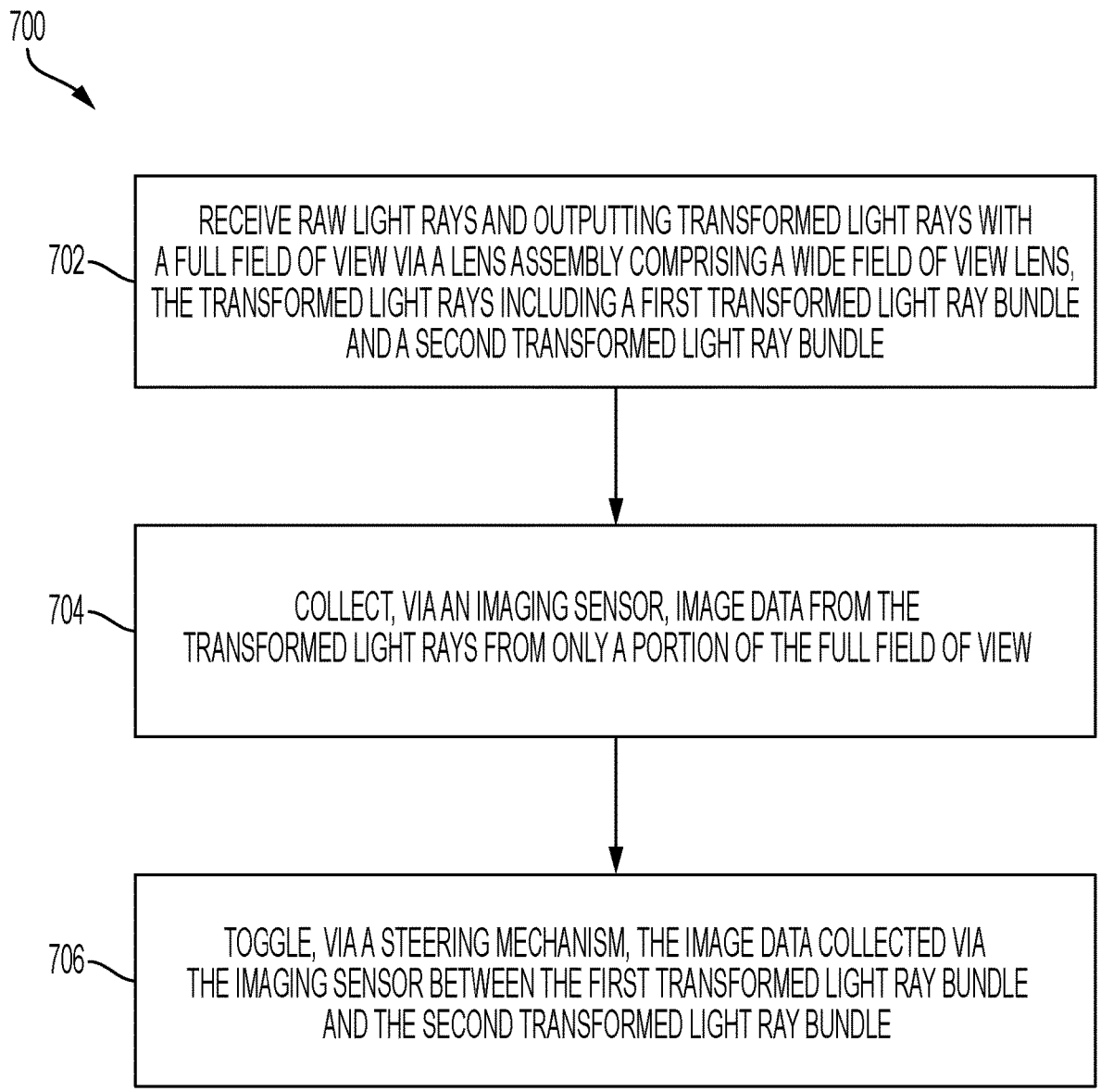
FIG. 7 is an illustration of a flowchart of an example method for operating an imaging system according to an example.

FIG. 7 shows an example method 700 for operating an imaging system according to an example. The method 700 can generally be implemented for operating an imaging system, such as, for example, the imaging system 300 (FIG. 3), the imaging system 400 (FIG. 4), the imaging system 500 (FIG. 5) and/or the imaging system 600 (FIG. 6), already discussed.

Illustrated processing block 702 provides for receiving raw light rays and outputting transformed light rays. For example, raw light rays are received and transformed light rays are output with a full field of view via a lens assembly comprising a wide field of view lens. In some implementations, the transformed light rays include a first transformed light ray bundle and a second transformed light ray bundle.

Illustrated processing block 704 provides for collecting image data from the transformed light rays. For example, an imaging sensor collects image data from the transformed light rays from only a portion of the full field of view.

Illustrated processing block 706 provides for toggling the image data collected via the imaging sensor between the first transformed light ray bundle and the second transformed light ray bundle. For example, a steering mechanism toggles the image data collected via the imaging sensor between the first transformed light ray bundle and the second transformed light ray bundle.

Figure 8:
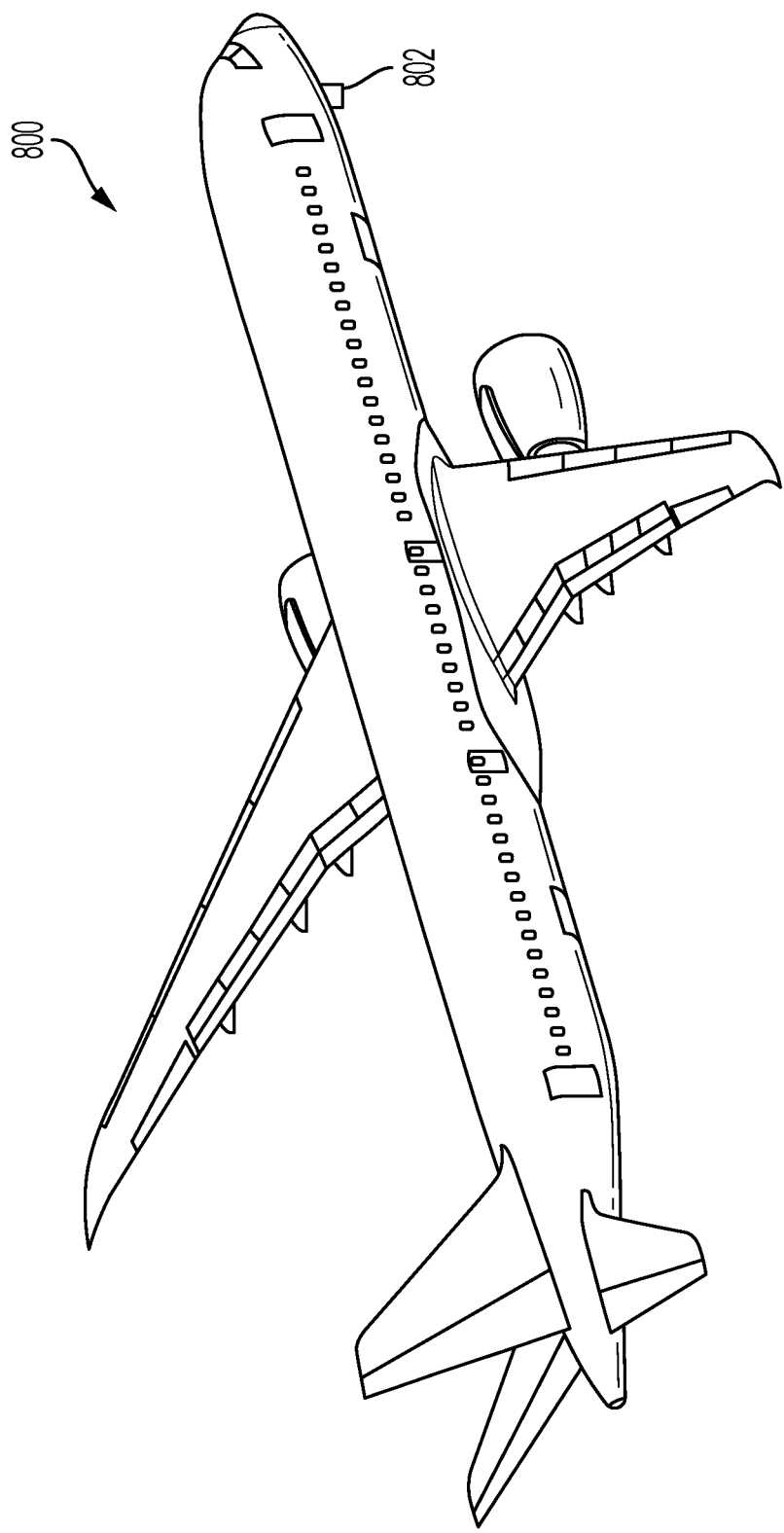
FIG. 8 is an illustration of a vehicle with an imaging system according to an example.

FIG. 8 is an illustration of a vehicle 800 with an imaging system 802 according to an example. As illustrated, vehicle 800 is a commercial fixed-wing aircraft. In other examples, vehicle 800 may be a hypersonic craft, a rocket, an unmanned aerial vehicle, a helicopter, a ground vehicle, a space vehicle, the like, and/or combinations thereof.

In an example, the vehicle 800 includes imaging system 802 coupled to vehicle. Such an imaging system 802 incorporates one or more aspects the imaging system 200 (FIG. 2), the imaging system 300 (FIG. 3), the imaging system 400 (FIG. 4), the imaging system 500 (FIG. 5), and/or the imaging system 600 (FIG. 6), already discussed.

In some examples, the imaging system 802 (as an entire camera and sensor assembly) may be mounted on a slower-moving addressable mount (e.g., which is attached to a structure or the vehicle 800) while the internal scanning element moves significantly faster. Such an implementation can be used to scan and/or stabilize the image.

Figure 14:
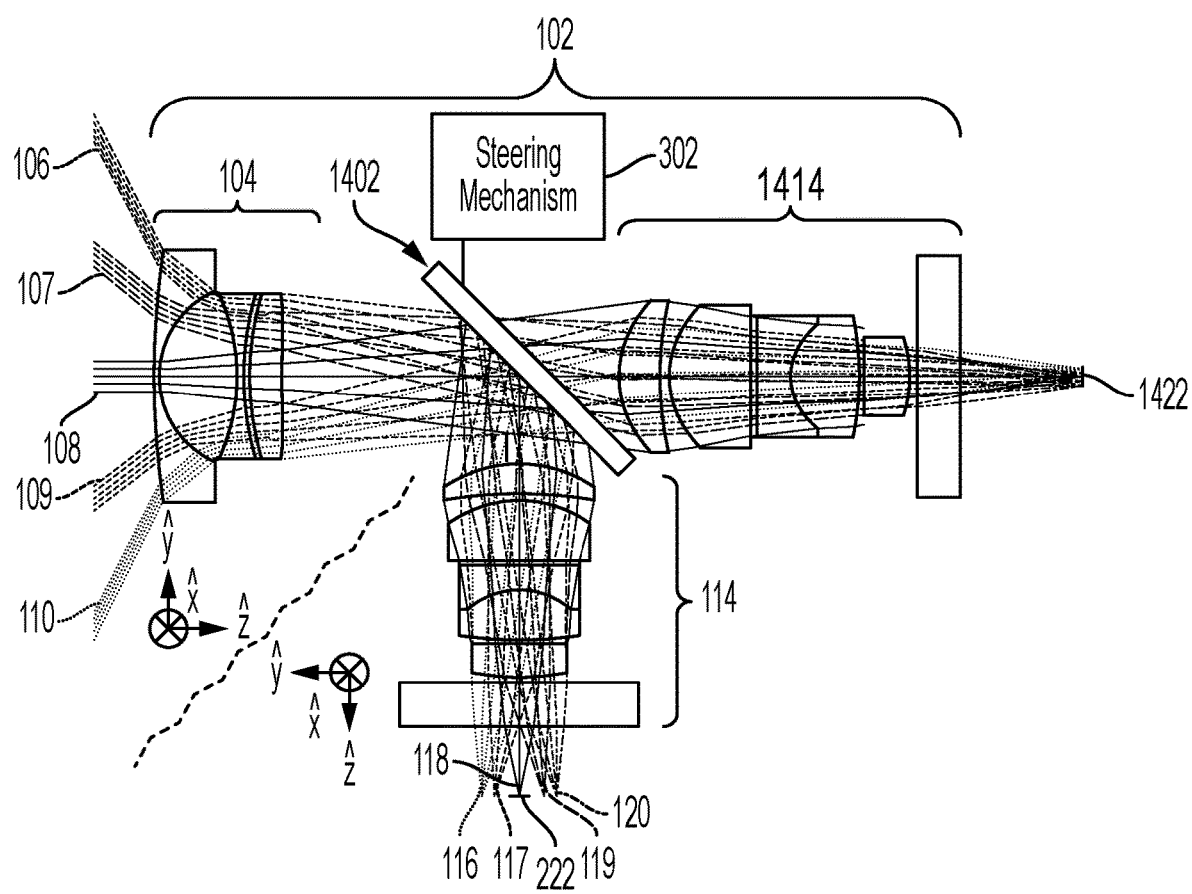
FIG. 14 is an illustration of an imaging system illustrating a steering mechanism including a partially reflective mirror according to an example.

FIG. 14 is an illustration of an imaging system illustrating a steering mechanism including a partially reflective mirror 1402 according to an example. As illustrated, the imaging system can use a partially reflective mirror 1402. This would split all incoming light ray bundles into two. The bundles that are not reflected could then be routed through optics 1414 different from 114, such that the full field of regard of the entire lens system of lens assembly 102 would be projected onto a sensor 1422. The thickness of this partially reflective mirror 1402 would translate the not-reflected bundles of light laterally, depending on the angle of the partially reflective mirror 1402, meaning some small variable translation would be incurred for the light incident on the sensor 1422 according to the selected field of view that is chosen to reach imaging sensor 222. Appropriate choices can minimize this translation to negligible values, such as using a very thin mirror for partially reflective mirror 1402, or introducing a compensating element in the not-reflected path after partially reflective mirror 1402, or by modifying the overall lens design such that the light rays incident upon (and through) partially reflective mirror 1402 are well collimated resulting in high angle sensitivity for partially reflective mirror 1402 and therefore minimal variation in the translation of light on sensor 1422.

In some examples, the light rays incident on sensor 1422 can provide information on the contextual orientation of the overall assembly (e.g., such as might be provided by a star tracker or other feature tracking algorithm). The steering mechanism 302 could then receive commands from a processing system to correct for any variation in the orientation of the overall assembly, as might be experienced when the entire system is mounted on a vehicle or on a structure of insufficient stiffness. This would allow for image stabilization.

ADDITIONAL NOTES AND EXAMPLES

Clause 1. An imaging system comprising: a lens assembly comprising a wide field of view lens, the lens assembly to receive raw light rays and to output transformed light rays with a full field of view, the transformed light rays including a first transformed light ray bundle and a second transformed light ray bundle; an imaging sensor, wherein the imaging sensor is sized to collect image data from the transformed light rays from only a portion of the full field of view; and a steering mechanism to toggle the image data collected via the imaging sensor between the first transformed light ray bundle and the second transformed light ray bundle.

Clause 2. The imaging system of Clause 1, wherein the wide field of view lens comprises a fisheye lens having a range of between 45 degrees and 270 degrees.

Clause 3. The imaging system of any one of Clauses 1 to 2, wherein the lens assembly comprises a negative lens group to receive the raw light rays and a positive lens group located downstream from the negative lens group.

Clause 4. The imaging system of any one of Clauses 1 to 2, wherein the steering mechanism is coupled to the imaging sensor to move the imaging sensor in two degrees of freedom.

Clause 5. The imaging system of Clause 3, wherein the steering mechanism is located between the negative lens group and the positive lens group, and wherein the steering mechanism comprises two or more dispersion-corrected prisms.

Clause 6. The imaging system of Clause 3, wherein the steering mechanism is located between the negative lens group and the positive lens group, and wherein the steering mechanism comprises a laterally translatable lens.

Clause 7. The imaging system of Clause 3, wherein the steering mechanism is located between the negative lens group and the positive lens group, and wherein the steering mechanism comprises a single two degree-of-freedom mirror.

Clause 8. The imaging system of Clause 3, wherein the steering mechanism is located between the negative lens group and the positive lens group, and wherein the steering mechanism comprises two single degree-of-freedom mirrors.

Clause 9. The imaging system of Clause 3, wherein the steering mechanism is located between the negative lens group and the positive lens group, and wherein the steering mechanism comprises three single degree-of-freedom mirrors.

Clause 10. The imaging system of any one of Clauses 3, wherein the steering mechanism is located between the negative lens group and the positive lens group, and wherein the steering mechanism comprises a partially reflective mirror.

Clause 11. A system comprising: a vehicle; and an imaging system coupled to the vehicle. The imaging system comprises: a lens assembly comprising a wide field of view lens, the lens assembly to receive raw light rays and to output transformed light rays with a full field of view, the transformed light rays including a first transformed light ray bundle and a second transformed light ray bundle; an imaging sensor, wherein the imaging sensor is sized to collect image data from the transformed light rays from only a portion of the full field of view; and a steering mechanism to toggle the image data collected via the imaging sensor between the first transformed light ray bundle and the second transformed light ray bundle.

Clause 12. The system of Clause 11, wherein the lens assembly comprises a negative lens group to receive the raw light rays and a positive lens group located downstream from the negative lens group.

Clause 13. The system of any one of Clauses 11 to 12, wherein the steering mechanism is coupled to the imaging sensor to move the imaging sensor in two degrees of freedom.

Clause 14. The system of Clause 12, wherein the steering mechanism is located between the negative lens group and the positive lens group, and wherein the steering mechanism comprises two or more dispersion-corrected prisms.

Clause 15. The system of Clause 12, wherein the steering mechanism is located between the negative lens group and the positive lens group, and wherein the steering mechanism comprises a laterally translatable lens.

Clause 16. The system of Clause 12, wherein the steering mechanism is located between the negative lens group and the positive lens group, and wherein the steering mechanism comprises a single two degree-of-freedom mirror.

Clause 17. The system of Clause 12, wherein the steering mechanism is located between the negative lens group and the positive lens group, and wherein the steering mechanism comprises two single degree-of-freedom mirrors.

Clause 18. The system of Clause 12, wherein the steering mechanism is located between the negative lens group and the positive lens group, and wherein the steering mechanism comprises three single degree-of-freedom mirrors.

Clause 19. A method comprising: receiving raw light rays and outputting transformed light rays with a full field of view via a lens assembly comprising a wide field of view lens, the transformed light rays including a first transformed light ray bundle and a second transformed light ray bundle; collecting, via an imaging sensor, image data from the transformed light rays from only a portion of the full field of view; and toggling, via a steering mechanism, the image data collected via the imaging sensor between the first transformed light ray bundle and the second transformed light ray bundle.

Clause 20. The method of Clause 19, wherein the steering mechanism is coupled to the imaging sensor to move the imaging sensor in two degrees of freedom.

Clause 21 includes an apparatus comprising means for performing the function of any preceding example.

All definitions, as defined and used herein, should be understood to control over dictionary definitions, definitions in documents incorporated by reference, and/or ordinary meanings of the defined terms.

Furthermore, for ease of understanding, certain functional blocks can have been delineated as separate blocks; however, these separately delineated blocks should not necessarily be construed as being in the order in which they are discussed or otherwise presented herein. For example, some blocks can be able to be performed in an alternative ordering, simultaneously, etc.

The terms "coupled," "attached," or "connected" can be used herein to refer to any type of relationship, direct or indirect, between the components in question, and can apply to electrical, mechanical, fluid, optical, electromagnetic, electro-mechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action can occur, either in a direct or indirect manner.

Although a number of illustrative examples are described herein, it should be understood that numerous other modifications and examples can be devised by those skilled in the art that will fall within the spirit and scope of the principles of the foregoing disclosure. More particularly, reasonable variations and modifications are possible in the component parts and/or arrangements of the subject combination arrangement within the scope of the foregoing disclosure, the drawings and the appended claims without departing from the spirit of the foregoing disclosure. In addition to variations and modifications in the component parts and/or arrangements, alternative uses will also be apparent to those skilled in the art. The examples can be combined to form additional examples.

We claim:

1. An imaging system comprising:
   a lens assembly comprising a wide field of view lens, the lens assembly to receive raw light rays and to output transformed light rays with a full field of view, the transformed light rays including a first transformed light ray bundle and a second transformed light ray bundle;
   an imaging sensor, wherein the imaging sensor is sized to collect image data from the transformed light rays from only a portion of the full field of view; and
   a steering mechanism to toggle the image data collected via the imaging sensor between the first transformed light ray bundle and the second transformed light ray bundle.

2. The imaging system of claim 1, wherein the wide field of view lens comprises a fisheye lens having a range of between 45 degrees and 270 degrees.

3. The imaging system of claim 1, wherein the lens assembly comprises a negative lens group to receive the raw light rays and a positive lens group located downstream from the negative lens group.

4. The imaging system of claim 1, wherein the steering mechanism is coupled to the imaging sensor to move the imaging sensor in two degrees of freedom.

5. The imaging system of claim 3, wherein the steering mechanism is located between the negative lens group and the positive lens group, and wherein the steering mechanism comprises two or more dispersion-corrected prisms.

6. The imaging system of claim 3, wherein the steering mechanism is located between the negative lens group and the positive lens group, and wherein the steering mechanism comprises a laterally translatable lens.

7. The imaging system of claim 3, wherein the steering mechanism is located between the negative lens group and the positive lens group, and wherein the steering mechanism comprises a single two degree-of-freedom mirror.

8. The imaging system of claim 3, wherein the steering mechanism is located between the negative lens group and the positive lens group, and wherein the steering mechanism comprises two single degree-of-freedom mirrors.

9. The imaging system of claim 3, wherein the steering mechanism is located between the negative lens group and the positive lens group, and wherein the steering mechanism comprises three single degree-of-freedom mirrors.

10. The imaging system of claim 3, wherein the steering mechanism is located between the negative lens group and the positive lens group, and wherein the steering mechanism comprises a partially reflective mirror.

11. A system comprising:
    a vehicle; and
    an imaging system coupled to the vehicle, the imaging system comprising:
    a lens assembly comprising a wide field of view lens, the lens assembly to receive raw light rays and to output transformed light rays with a full field of view, the transformed light rays including a first transformed light ray bundle and a second transformed light ray bundle;
    an imaging sensor, wherein the imaging sensor is sized to collect image data from the transformed light rays from only a portion of the full field of view; and
    a steering mechanism to toggle the image data collected via the imaging sensor between the first transformed light ray bundle and the second transformed light ray bundle.

12. The system of claim 11, wherein the lens assembly comprises a negative lens group to receive the raw light rays and a positive lens group located downstream from the negative lens group.

13. The system of claim 11, wherein the steering mechanism is coupled to the imaging sensor to move the imaging sensor in two degrees of freedom.

14. The system of claim 12, wherein the steering mechanism is located between the negative lens group and the positive lens group, and wherein the steering mechanism comprises two or more dispersion-corrected prisms.

15. The system of claim 12, wherein the steering mechanism is located between the negative lens group and the positive lens group, and wherein the steering mechanism comprises a laterally translatable lens.

16. The system of claim 12, wherein the steering mechanism is located between the negative lens group and the positive lens group, and wherein the steering mechanism comprises a single two degree-of-freedom mirror.

17. The system of claim 12, wherein the steering mechanism is located between the negative lens group and the positive lens group, and wherein the steering mechanism comprises two single degree-of-freedom mirrors.

18. The system of claim 12, wherein the steering mechanism is located between the negative lens group and the positive lens group, and wherein the steering mechanism comprises three single degree-of-freedom mirrors.

19. A method comprising:
  receiving raw light rays and outputting transformed light rays with a full field of view via a lens assembly comprising a wide field of view lens, the transformed light rays including a first transformed light ray bundle and a second transformed light ray bundle;
  collecting, via an imaging sensor, image data from the transformed light rays from only a portion of the full field of view; and
  toggling, via a steering mechanism, the image data collected via the imaging sensor between the first transformed light ray bundle and the second transformed light ray bundle.

20. The method of claim 19, wherein the steering mechanism is coupled to the imaging sensor to move the imaging sensor in two degrees of freedom.

\* \* \* \* \*